(12) United States Patent
Sankara et al.

(10) Patent No.: US 9,631,581 B2
(45) Date of Patent: Apr. 25, 2017

(54) DONOR CYLINDER ENGINE SYSTEM IMPLEMENTING SKIP FIRING

(71) Applicant: Electro-Motive Diesel, Inc., LaGrange, IL (US)

(72) Inventors: Reddy Pocha Siva Sankara, Lisle, IL (US); Michael B. Goetzke, Orland Park, IL (US); LeBlanc Martin, Munster, IN (US); Travis Eugene Barnes, Metamora, IL (US); Nathan Michael McDonald, Elmhurst, IL (US); Leeder Hua, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 419 days.

(21) Appl. No.: 14/298,119

(22) Filed: Jun. 6, 2014

(65) Prior Publication Data

US 2015/0354509 A1 Dec. 10, 2015

(51) Int. Cl.
| F02M 25/07 | (2006.01) |
| F02B 75/22 | (2006.01) |
| F02D 17/02 | (2006.01) |
| F02D 41/00 | (2006.01) |
| F02M 26/43 | (2016.01) |
| F02M 26/05 | (2016.01) |
| F02M 26/44 | (2016.01) |

(52) U.S. Cl.
CPC ....... *F02M 25/0749* (2013.01); *F02B 75/228* (2013.01); *F02D 17/02* (2013.01); *F02D 41/005* (2013.01); *F02D 41/0082* (2013.01); *F02M 26/05* (2016.02); *F02M 26/43* (2016.02); *F02M 26/44* (2016.02); *F02B 75/22* (2013.01); *Y02T 10/47* (2013.01)

(58) Field of Classification Search
CPC .... F02M 25/0749; F02M 26/43; F02M 26/05; F02M 26/44; F02B 75/228; F02D 17/02; F02D 41/0082; F02D 41/005
See application file for complete search history.

(56) References Cited

U.S. PATENT DOCUMENTS

| 4,143,635 | A | 3/1979 | Ilzuka et al. |
| 5,121,734 | A | 6/1992 | Grieshaber et al. |
| 8,215,284 | B2 | 7/2012 | Suzuki et al. |
| 2009/0013969 | A1 | 1/2009 | Winstead |
| 2011/0030662 | A1 | 2/2011 | Zitzler et al. |

(Continued)

*Primary Examiner* — Jacob Amick
(74) *Attorney, Agent, or Firm* — Finnegan, Henderson, Farabow, Garrett & Dunner, LLP

(57) ABSTRACT

An engine system is disclosed. The engine system may have a first bank of cylinders, a second bank of cylinders, a first intake manifold, and a second intake manifold. The engine system may also have a first exhaust manifold connecting the first bank of cylinders to the first and second intake manifolds, a second exhaust manifold connecting the second bank of cylinders to the atmosphere, a plurality of injectors, and a controller. The controller may be configured to inhibit the plurality of injectors associated with a first cylinder subset of the first and second banks of cylinders from firing for a first period of time spanning multiple engine cycles. The controller may also be configured to selectively inhibit the plurality of injectors associated with a second cylinder subset of the first and second banks of cylinders from firing for a second period of time following the first period of time.

20 Claims, 2 Drawing Sheets

(56) References Cited

U.S. PATENT DOCUMENTS

| | | |
|---|---|---|
| 2012/0078492 A1 | 3/2012 | Freund et al. |
| 2012/0298070 A1* | 11/2012 | Akinyemi ............ F02D 41/0047 |
| | | 123/294 |
| 2013/0000277 A1 | 1/2013 | Uzkan et al. |
| 2013/0006497 A1 | 1/2013 | Silvers et al. |
| 2014/0034014 A1* | 2/2014 | Blythe ................ F02D 41/1497 |
| | | 123/435 |
| 2014/0251246 A1* | 9/2014 | Flynn ........................ F01L 1/34 |
| | | 123/90.16 |

* cited by examiner

| (CYLINDER NUMBER) | 1 | 11 | 6 | 8 | | | | | | | | |
|---|---|---|---|---|---|---|---|---|---|---|---|---|
| FIRING ANGLE (DEG. CRANK) | 0 | 165 | 360 | 525 | | | | | | | | |
| BANK POSITION (LEFT (L)/RIGHT (R)) | L | R | L | R | | | | | | | | |
| CYLINDER TYPE: (DONOR (D)/NON DONOR (ND)) | D | ND | D | ND | | | | | | | | |
| FIRING INTERVAL BETWEEN THE CYLINDERS (DEG. CRANK) | 195 | 165 | 195 | 165 | | | | | | | | |
| FIRING INTERVAL BETWEEN DONOR CYLINDERS (DEG. CRANK) | - | 360 | - | 360 | | | | | | | | |
| FIRING INTERVAL BETWEEN NON DONOR/ STANDARD CYLINDERS (DEG. CRANK) | 360 | - | 360 | - | | | | | | | | |
| (CYLINDER NUMBER) | | | | | 7 | 3 | 12 | 4 | | | | |
| FIRING ANGLE (DEG. CRANK) | | | | | 765 | 960 | 1125 | 1320 | | | | |
| BANK POSITION (LEFT (L)/RIGHT (R)) | | | | | R | L | R | L | | | | |
| CYLINDER TYPE: (DONOR (D)/NON DONOR (ND)) | | | | | ND | D | ND | D | | | | |
| FIRING INTERVAL BETWEEN THE CYLINDERS (DEG. CRANK) | | | | | 165 | 195 | 165 | 195 | | | | |
| FIRING INTERVAL BETWEEN DONOR CYLINDERS (DEG. CRANK) | | | | | - | 360 | - | 360 | | | | |
| FIRING INTERVAL BETWEEN NON DONOR/ STANDARD CYLINDERS (DEG. CRANK) | | | | | 360 | - | 360 | - | | | | |
| (CYLINDER NUMBER) | | | | | | | | | 5 | 9 | 2 | 10 |
| FIRING ANGLE (DEG. CRANK) | | | | | | | | | 1560 | 1725 | 1920 | 2085 |
| BANK POSITION (LEFT (L)/RIGHT (R)) | | | | | | | | | L | R | L | R |
| CYLINDER TYPE: (DONOR (D)/NON DONOR (ND)) | | | | | | | | | D | ND | D | ND |
| FIRING INTERVAL BETWEEN THE CYLINDERS (DEG. CRANK) | | | | | | | | | 195 | 165 | 195 | 165 |
| FIRING INTERVAL BETWEEN DONOR CYLINDERS (DEG. CRANK) | | | | | | | | | - | 360 | - | 360 |
| FIRING INTERVAL BETWEEN NON DONOR/ STANDARD CYLINDERS (DEG. CRANK) | | | | | | | | | 360 | - | 360 | - |

*FIG. 2*

DONOR CYLINDER ENGINE SYSTEM IMPLEMENTING SKIP FIRING

TECHNICAL FIELD

The present disclosure is directed to an engine system and, more particularly, to an engine system implementing donor cylinder exhaust gas recirculation (EGR) and skip firing.

BACKGROUND

Combustion engines such as diesel engines, gasoline engines, and gaseous fuel-powered engines are supplied with a mixture of air and fuel for combustion within the engine that generates a mechanical power output and a flow of exhaust gases. The exhaust gases can include a complex mixture of air pollutants produced as byproducts of the combustion process. For example, an engine can produce NOx, particulate matter, and hydrocarbons. And due to increased attention on the environment, the amount of pollutants emitted to the atmosphere from an engine can be regulated depending on the type of engine, size of engine, and/or class of engine.

One method that has been implemented by engine manufacturers to comply with the regulation of exhaust emissions includes exhaust gas recirculation (EGR). EGR is the recirculation of a portion of the exhaust gas produced by the engine back to the intake of the engine to mix with fresh combustion air. The resulting mixture, when ignited, produces a lower combustion temperature and a corresponding reduced amount of NOx.

A multi-cylinder engine implementing EGR can include some cylinders that are designated as "donor" cylinders, and other cylinders that are designated as "non-donor" cylinders. Donor cylinders donate all or part of their exhaust for the purpose of EGR. In contrast, non-donor cylinders do not donate any exhaust for EGR purposes. Instead, the exhaust from non-donor cylinders is directed to the atmosphere. This type of engine is known as a donor engine, and control over EGR in a donor engine may be simplified when compared to a conventional engine.

Another method of engine control implemented by engine manufacturers is known as "skip firing". Skip firing includes the selective deactivation of some of the cylinders of an engine during low-load operations. By deactivating some of the cylinders, the remaining active cylinders must produce more power in order to still satisfy a given load. And operating the remaining cylinders at the higher power output may result in a more efficient combustion process that produces lower levels of particulate matter and hydrocarbons. In addition, a fuel savings may be realized during skip firing in some applications.

An exemplary engine implementing both EGR and skip firing is disclosed in U.S. Patent Application 2012/0298070 of Akinyemi et al. that published on Nov. 29, 2012 ("the '070 publication"). In particular, the '070 publication discloses an engine having twelve cylinders divided into two banks (e.g., a first bank having cylinders 1-6, and a second bank having cylinders 7-12), wherein four of the cylinders (e.g., cylinders 2, 5, 9, and 10) are designated as donor cylinders. A normal-load firing order of the engine is 1-7-5-11-3-9-6-12-2-8-4-10. The engine selectively deactivates six of the cylinders at low engine load, so as to raise the load on the remaining six active cylinders. Specifically, during a first engine cycle, only cylinders 1-5-3-6-2-4 are fired, while in the ensuing engine cycle, only cylinders 7-11-9-12-8-10 are fired. Each cylinder is fired once every two engine cycles. Different patterns of skip firing may be implemented to provide desired levels of EGR.

Although the engine of the '070 publication may have improved emissions and fuel economy in some situations, it may also suffer drawbacks in other situations. For example, the engine of the '070 publication may be prone to vibration-related failures (e.g., engine mount failure), high noise, and/or erratic emissions output. Specifically, when using the conventional firing order listed above, the engine may alternate cylinder firing evenly between the first and second cylinder banks. That is, for the firing order 1-7-5-11-3-9-6-12-2-8-4-10, the engine will fire a first bank cylinder, a second bank cylinder, a first bank cylinder, etc. Likewise, every third firing cylinder may be a donor cylinder. Accordingly, the conventional firing order may result in a mechanically balanced engine having low vibration and fairly consistent EGR flow rates. However, when skip firing using only six cylinders to power a load in the firing order listed above, the engine would suddenly be required to fire all first bank cylinders during the first engine cycle and then all second bank cylinders during the second engine cycle, which is mechanically imbalanced and has the potential to induce severe vibrations within the engine. In addition, during the first engine cycle, one donor cylinder will fire, followed by two non-donor cylinders, followed by another donor cylinder. And in the second engine cycle, two non-donor cylinders will fire, followed by two donor cylinders, followed by two non-donor cylinders. And at the transition between cycles, three non-donor cylinders will fire consecutively. This variability in EGR exhaust donation could cause erratic swings in the levels of regulated exhaust constituents being produced and discharged to the atmosphere.

The disclosed engine system is directed to overcoming one or more of the problems set forth above and/or other problems of the prior art.

SUMMARY

In one aspect, the present disclosure is directed toward an engine system. The engine system may include a first bank of cylinders, a second bank of cylinders, a first intake manifold associated with the first bank of cylinders, and a second intake manifold associated with the second bank of cylinders. The engine system may also include a first exhaust manifold connecting the first bank of cylinders to the first and second intake manifolds, a second exhaust manifold connecting the second bank of cylinders to the atmosphere, and a plurality of injectors, each associated with a different cylinder in the first and second banks of cylinders. The engine system may further include a controller in communication with the plurality of fuel injectors. The controller may be configured to selectively inhibit the plurality of injectors associated with a first cylinder subset of the first and second banks of cylinders from firing for a first period of time spanning multiple engine cycles. The controller may also be configured to selectively inhibit the plurality of injectors associated with a second cylinder subset of the first and second banks of cylinders from firing for a second period of time spanning multiple engine cycles following the first period of time.

In another aspect, the present disclosure is directed toward another engine system. This engine system may include a first bank of cylinders, a second bank of cylinders, a first intake manifold associated with the first bank of cylinders, and a second intake manifold associated with the second bank of cylinders. The engine system may also include a first exhaust manifold connecting the first bank of cylinders to the first and second intake manifolds, a second exhaust manifold connecting the second bank of cylinders to the atmosphere, and a plurality of injectors, each associated with a different cylinder in the first and second banks of cylinders. The engine system may further include a controller in communication with the plurality of fuel injectors. The controller may be configured to selectively inhibit the plurality of injectors associated with a first cylinder subset of the first and second banks of cylinders from firing for a first period of time spanning multiple engine cycles during a low-load condition, selectively inhibit the plurality of injectors associated with a second cylinder subset of the first and second banks of cylinders from firing for a second period of time spanning multiple engine cycles following the first period of time during the low-load condition, and selectively inhibit the plurality of injectors associated with a third cylinder subset of the first and second banks of cylinders from firing for a third period of time spanning multiple engine cycles following the second period of time during the low-load condition. A firing interval of the first, second, and third cylinder subsets during the low-load condition is always between about 165-195° of crank angle. A separate firing interval of each of the first and second cylinder banks during the low-load condition is always about 360° of crank angle.

In yet another aspect, the present disclosure is directed toward a method of operating an engine system having multiple cylinders arranged into a first donor bank sequentially numbered 1-6 and a second non-donor bank sequentially numbered 7-12. The method may include firing the multiple cylinders during a normal-load condition according to the following pattern: 1-7-5-11-3-9-6-12-2-8-4-10. The method may also include selectively firing for a first period of time spanning multiple engine cycles only a first subset of two cylinders from each of the first donor and second non-donor banks according to the following pattern: 1-11-6-8. The method may further include selectively firing for a second period of time spanning multiple engine cycles following the first period of time only a second subset of two cylinders from each of the first donor and second non-donor banks according to the following pattern: 7-3-6-8. The method may additionally include selectively firing for a third period of time spanning multiple engine cycles following the second period of time only a third subset of two cylinders from each of the first donor and second non-donor banks according to the following pattern: 5-9-2-10. A firing interval of the first, second, and third subsets during the low-load condition is always between about 165-195° of crank angle. A separate firing interval of each of the first and second cylinder banks during the low-load condition is always about 360° of crank angle.

BRIEF DESCRIPTION OF THE DRAWINGS

FIG. 2 is chart depicting an exemplary disclosed control algorithm associated with the engine system of FIG. 1.

DETAILED DESCRIPTION

Figure 1:
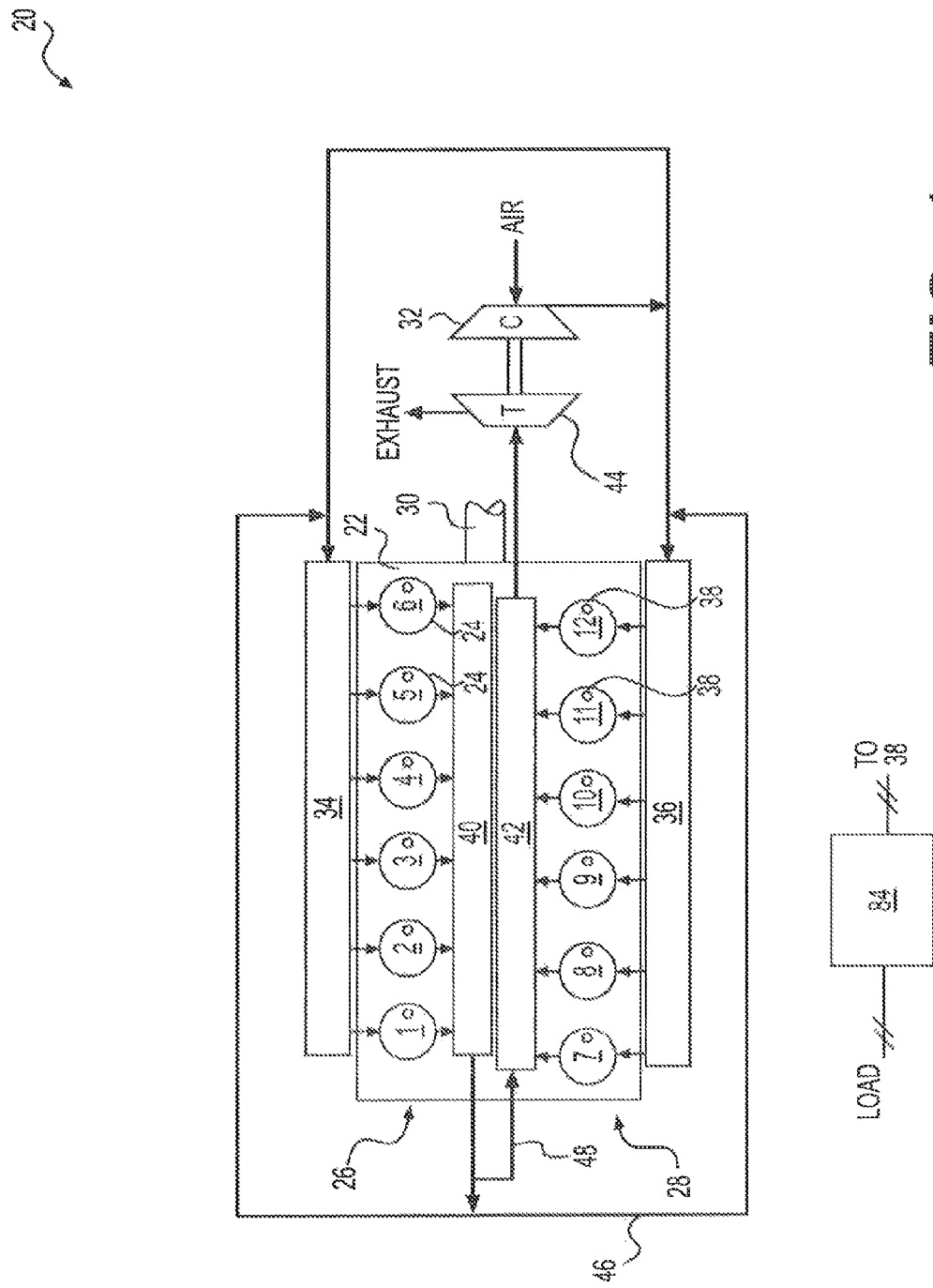
FIG. 1 is a schematic illustration of an exemplary disclosed engine system.

FIG. 1 illustrates an exemplary engine system 20. Although engine system 20 is shown and described below as embodying a four-stroke diesel fueled engine, it is contemplated that engine system 20 may be another type of engine (e.g., a four-stroke natural gas, gasoline, or dual fuel engine, or a two-stroke engine configured to consume diesel fuel, natural gas, and/or gasoline), if desired. Engine system 20 may include, among other things, an engine block 22 at least partially defining a plurality of cylinders 24. Although shown as a twelve-cylinder engine, engine system 20 may include any number of cylinders 24. Cylinders 24 may be disposed in a "V" configuration, for example in a first or left bank 26 and in a second or right bank 28 that are oriented at an angle relative to each other. Cylinders 24 in bank 26 may be placed at positions 1-6, while cylinders 24 in bank 28 may be placed at positions 7-12.

A piston (not shown) may be slidably disposed within each cylinder 24, and connected to rotate with a crankshaft 30. As crankshaft 30 rotates through two complete revolutions (e.g., through about 720°), each piston may undergo four full strokes resulting in a single combustion event (a.k.a., a firing) within each cylinder 24. In the disclosed embodiment, a full- or normal-load firing order (with respect to the numbered positions) of cylinders 24 may be 1-7-5-11-3-9-6-12-2-8-4-10, with one cylinder 24 in the order firing about once every 60° of crankshaft rotation.

Engine system 20 may include at least one compressor 32 configured to compress air and direct the compressed air into cylinders 24 via first and second intake manifolds 34, 36. Any number of compressors 32 may be utilized, as desired, and arranged in any configuration (e.g., in series and/or parallel). The air may be drawn through filters (not shown), and pushed through coolers (not shown) before entering manifolds 34, 36 to condition the air for combustion.

Fuel may be mixed with the combustion air before, during, and/or after entering cylinders 24. For example, one or more fuel injectors (e.g., liquid and/or gaseous fuel injectors) 38 may be associated with cylinders 24, and configured to inject fuel for mixture with the air and subsequent combustion. When fuel is sprayed into cylinders 24 via injectors 38, a combustion event may take place at commencement of an associated power stroke. Likewise, when a particular injector 38 is inhibited from injecting fuel, the corresponding cylinder 24 may be inhibited from firing (i.e., skipped). In this manner, particular cylinders 24 may be effectively skipped to alter the firing order described above.

Exhaust from cylinders 24 may be discharged into first and second exhaust manifolds 40, 42 associated with first and second banks 26, 28, respectively. In particular, cylinders 24 in positions 1-6 may discharge into manifold 40, while cylinders 24 in positions 7-12 may separately discharge into manifold 42. Exhaust from manifold 42 may then pass through at least one turbine 44 to the atmosphere. Turbine 44 may be driven by the exhaust to rotate compressor 32 and pressurize the inlet air. Any number of turbines 44 may be utilized, as desired, and arranged in any configuration (e.g., in series and/or parallel). The exhaust may pass through filters, catalysts, traps, oxidizers, attenuators, and/or other aftertreatment devices before entering the atmosphere.

Exhaust from manifold 42 may not be directed through turbine 44. Instead, the exhaust from manifold 42 may be directed back to the inlet of engine system 20. Specifically, the exhaust may be directed through one or more passages 46 back to intake manifolds 34, 36 in parallel. The exhaust may pass through a cooler (not shown) and/or a filter (not shown), before mixing with pressurized air downstream of compressor 32. In this manner, exhaust from only cylinders 24 in positions 1-6 may be recirculated and distributed evenly to all cylinders 24 for subsequent combustion during the next engine cycle. Accordingly, cylinders 24 in positions 1-6 may be known as donor cylinders (i.e., cylinders that donate exhaust gas for recirculation), whereas cylinders 24 in positions 7-12 may be known as non-donor cylinders.

In some embodiments, a bypass passage 48 may be provided to selectively allow exhaust from manifold 40 to join with exhaust from manifold 42, thereby helping to balance pressures within manifolds 40, 42. A control valve and/or restricted orifice (not shown) may be placed within bypass passage 48 to regulate the rate of exhaust flow from manifold 40 into manifold 42, if desired. Alternatively or additionally, one or more control valves (not shown) may similarly be placed within one or more branches of passage 46. Bypass passage 48 may be omitted, if desired.

A controller 84 may be in communication with engine system 20, and configured to selectively implement a skip firing algorithm intended to improve fuel efficiency during low-load conditions. Controller 84 may embody a single microprocessor or multiple microprocessors that include a means for controlling an operation of engine system 20. Numerous commercially available microprocessors can be configured to perform the functions of controller 84. It should be appreciated that controller 84 could readily be embodied in a general machine microprocessor capable of controlling numerous machine functions. Controller 84 may include a memory, a secondary storage device, a processor, and any other components for running an application. Various other circuits may be associated with controller 84 such as power supply circuitry, signal conditioning circuitry, solenoid driver circuitry, and other types of circuitry FIG. 2 illustrates the skip firing algorithm that may be selectively implemented by controller 84. The strategy may involve selectively skipping the firing of particular cylinders 24 at particular times, based on an overall load on engine system 20 (e.g., when a load on engine system 20 is less than a threshold amount). As described above, controller 84 may cause the skipping of particular cylinders 24 from the firing order of engine system 20 by inhibiting the associated injectors 38 from injecting fuel. The overall load on engine system 20 may be determined through any means known in the art, for example by monitoring an overall fuel injection amount, by monitoring the displacement of a throttle input device (not shown), by way of one or more load and/or speed sensors (not shown), or in any other suitable manner. FIG. 2 will be discussed in more detail in the following section.

INDUSTRIAL APPLICABILITY

The disclosed engine system may be implemented into any application where low emissions and high efficiency are desired. The disclosed engine system may provide for low emissions by way of FOR that is implemented via a donor/non-donor cylinder configuration. The disclosed engine system may provide for high efficiency through selective skip firing of particular cylinders during low-load conditions. Operation of engine system 20 will now be described, with respect to the control algorithm of FIG. 2.

As can be seen in the chart of FIG. 2, skip firing of engine system 20 may implemented with subsets of cylinders 24. In particular, cylinders 24 may be divided into three different subsets, each subset consisting of four cylinders 24. A first subset 52 may include cylinders 24 in positions 1, 6, 8, and 11; a second subset 54 may include cylinders 24 in positions 3, 4, 7, and 12; and a third subset 56 may include cylinders 24 in positions 2, 5, 9, and 10.

When engine system 20 experiences a low-load condition (i.e., when the overall load on engine system 20 is determined by controller 84 to be less than the threshold amount), controller 84 may selectively cause two of the subsets of cylinders 24 to stop firing. That is, only one of the subsets of cylinders 24 described above may fire at a time, and these cylinders 24 may continue firing for a predetermined number of engine cycles (or for a predetermined duration of time) before another subset of cylinders 24 may tire. In one example, a particular subset of cylinders 24 may fire during the low-load condition for at least 12 minutes before operation of engine system 20 transitions to the firing of another subset of cylinders 24. When operating at rated engine speed (e.g., at about 1500 rpm), this may result in about 9,000 firings (i.e., 1500 revolutions÷2 revolutions per firing×12 minutes) per cylinder 24 within the firing subset of cylinders 24, for a total of about 36,000 firings from each subset before the transition.

Each subset of cylinders 24 may be selected such that, when skip firing during low-load conditions, engine system 12 may be substantially mechanically balanced and the rate of exhaust gas being recirculated from the firing donor cylinders may be substantially steady. For example, cylinders 24 in first subset 52 may alternate firing from the left and right sides of engine system 20 (i.e., from first and second banks 26, 28). In other words, mechanical balance of engine system 20 may be achieved by inhibiting multiple consecutive firings from a single bank 26, 28 during low-load conditions, except when occasionally transitioning between subsets of cylinders 24. Likewise, the first subset 52 may alternate firing of donor and non-donor cylinders (abbreviated as D and ND in the chart of FIG. 2), such that the flow of donated exhaust gas may be substantially steady. Thus, in this example, the firing pattern for the first subset 52 may be 1-11-6-8, with a firing interval between all cylinders 24 of about 195° of crank angle, 165°, 195°, and 165° during the low-load condition. During this operation, the firing interval between donor cylinders (i.e., between cylinders 24 in positions 1 and 6) and the firing interval between non-donor cylinders may always be about 360°. And this may also be true for each of the second and thirds subsets 54, 56 during the low-load condition. For example, the firing order of the second subset 54 may be 7-3-12-4, and the firing order of the third set may be 5-9-2-10.

Only during the transition between firing of the first, second, and third subsets 52-56, the mechanical balance of engine system 20 may be temporarily interrupted. In particular, two cylinders 24 from the same bank may fire consecutively. For example, two cylinders 24 from second bank 28 may fire consecutively during the transition between the firing of the first subset 52 and the firing of the second subset 54. And both of these cylinders 24 may be non-donor cylinders. Similarly, two cylinders 24 from first bank 26 (both donor cylinders) may fire consecutively during transition between the second and third subsets 54, 56. However, this imbalanced firing may occur only once within about 72,000 firings, which may have little (if any) noticeable effect on the operation of engine system 20.

The time duration used between subset transitioning may account for desired thermal loading of engine system 20. Specifically, the time may be selected such that one portion of engine block 12 does not increase or decrease in temperature by an amount significant enough to result in damage (i.e., warping or straining). It should be recognized that the time duration of twelve minutes corresponds with a particular engine arrangement in a particular application under particular conditions, and may change for other arrangements, applications, and/or conditions.

The disclosed skip fire strategy may be applicable to other engines having a different number of cylinders 24 (e.g., 8 cylinders or 6 cylinders), if desired. In general, for an engine system 12 having an even number of cylinders 24, the total number of cylinders 24 should be divided into subsets each having an even number of cylinders 24. And within each subset, there should be an equal number of donor and non-donor cylinders 24, and an equal number of cylinders from different banks 26, 28. During law-load operation, cylinders 24 from the different banks 26, 28 within only one of the subsets should alternate firing. And during that firing, donor cylinders 24 should fire at a consistent interval. The firing of one subset of cylinders 24 should continue for a period of time (i.e., for multiple engine cycles and, preferably, for hundreds or even thousands of engine cycles), such that a transition between subsets during a single engine cycle will result in only a minor interruption (if any) in the mechanically balanced firing.

The use of donor cylinders from only a single bank 26 within engine system 20 may also enhance performance. That is, because exhaust recirculated within engine system 20 may only be provided by first bank 26 of cylinders 24 (and not by second bank 28 that communicates with turbine 44), the performance of turbine 44 may be tuned for high-performance without instabilities caused by periodic and/or changing recirculation demands.

It will be apparent to those skilled in the art that various modifications and variations can be made to the disclosed engine system. Other embodiments will be apparent to those skilled in the art from consideration of the specification and practice of the disclosed engine system. It is intended that the specification and examples be considered as exemplary only, with a true scope being indicated by the following claims and their equivalents.

What is claimed is:

1. An engine system, comprising:
    a first bank of cylinders;
    a second bank of cylinders;
    a first intake manifold associated with the first bank of cylinders;
    a second intake manifold associated with the second bank of cylinders;
    a first exhaust manifold connecting the first bank of cylinders to the first and second intake manifolds;
    a second exhaust manifold connecting the second bank of cylinders to the atmosphere;
    a plurality of injectors, each associated with a different cylinder in the first and second banks of cylinders; and
    a controller in communication with the plurality of injectors, the controller configured to:
        selectively inhibit the plurality of injectors associated with a first cylinder subset of the first and second banks of cylinders from firing for a first period of time spanning multiple engine cycles; and
        selectively inhibit the plurality of injectors associated with a second cylinder subset of the first and second banks of cylinders from firing for a second period of time spanning multiple engine cycles following the first period of time.

2. The engine system of claim 1, wherein each of the first and second cylinder subsets includes an equal number of cylinders from each of the first and second banks of cylinders.

3. The engine system of claim 2, wherein the controller is configured to allow the plurality of injectors to inject fuel in an order that alternates between the first and second banks of cylinders.

4. The engine system of claim 1, wherein the first and second periods of time are about equal.

5. The engine system of claim 4, wherein the first and second periods of time are determined based in part on achieving a desired thermal loading.

6. The engine system of claim 1, wherein:
    the first bank of cylinders are in positions numbered sequentially 1-6;
    the second bank of cylinders are in positions numbered sequentially 7-12; and
    a normal load firing order of the engine system is 1-7-5-11-3-9-6-12-2-8-4-10.

7. The engine system of claim 6, wherein the controller is configured to selectively inhibit the plurality of injectors from firing only during a low-load condition.

8. The engine system of claim 7, wherein a low-load firing order of the first cylinder subset is 1-11-6-8.

9. The engine system of claim 8, wherein a low-load firing order of the second cylinder subset is 7-3-12-4.

10. The engine system of claim 9, wherein:
    the engine system further includes a third cylinder subset of the first and second banks of cylinders; and
    a low-load firing order of the third cylinder subset is 5-9-2-10.

11. The engine system of claim 10, wherein the low-load firing order of each of the first, second, and third cylinder subsets results in every other firing being associated with exhaust gas recirculation donation.

12. The engine system of claim 11, wherein the low-load firing order of each of the first, second, and third cylinder subsets results in the engine system being mechanically balanced.

13. The engine system of claim 1, wherein a firing interval of the first and second cylinder subsets during a low-load condition is always between about 165-195° of crank angle.

14. The engine system of claim 3, wherein a firing interval of the first bank of cylinders during a low-load condition is always about 360° of crank angle.

15. The engine system of claim 14, wherein a firing interval of the second bank of cylinders during a low-load condition is always about 360° of crank angle.

16. The engine system of claim 1, further including a turbine connected to the second exhaust manifold.

17. The engine system of claim 16, further including a bypass passage connecting the first exhaust manifold to the second exhaust manifold.

18. An engine system, comprising:
    a first bank of cylinders;
    a second bank of cylinders;
    a first intake manifold associated with the first bank of cylinders;
    a second intake manifold associated with the second bank of cylinders;
    a first exhaust manifold connecting the first bank of cylinders to the first and second intake manifolds;
    a second exhaust manifold connecting the second bank of cylinders to the atmosphere;
    a plurality of injectors, each associated with a different cylinder in the first and second banks of cylinders; and
    a controller in communication with the plurality of injectors, the controller configured to:
        selectively inhibit the plurality of injectors associated with a first cylinder subset of the first and second banks of cylinders from firing for a first period of time spanning multiple engine cycles during a low-load condition;
        selectively inhibit the plurality of injectors associated with a second cylinder subset of the first and second banks of cylinders from firing for a second period of time spanning multiple engine cycles following the first period of time during the low-load condition; and selectively inhibit the plurality of injectors associated with a third cylinder subset of the first and second banks of cylinders from firing for a third period of time spanning multiple engine cycles following the second period of time during the low-load condition, wherein:
a firing interval of the first, second, and third cylinder subsets during the low-load condition is always between about 165-195° of crank angle; and
a separate firing interval of each of the first and second cylinder banks during the low-load condition is always about 360° of crank angle.

19. The engine system of claim 18, wherein:
each of the first, second, and third cylinder subsets includes two cylinders from each of the first and second banks of cylinders;
the first bank of cylinders are in positions numbered sequentially 1-6;
the second bank of cylinders are in positions numbered sequentially 7-12;
a normal load firing order of the engine system is 1-7-5-11-3-9-6-12-2-8-4-10;
a low-load firing order of the first cylinder subset is 1-11-6-8;
a low-load firing order of the second cylinder subset is 7-3-12-4; and
a low-load firing order of the third cylinder subset is 5-9-2-10.

20. A method of operating an engine system having multiple cylinders arranged into a first donor bank sequentially numbered 1-6 and a second non-donor bank sequentially numbered 7-12, comprising:
firing the multiple cylinders during a normal load condition according to the following pattern: 1-7-5-11-3-9-6-12-2-8-4-10;
selectively firing for a first period of time spanning multiple engine cycles during a low-load condition only a first subset of two cylinders from each of the first donor and second non-donor banks according to the following pattern: 1-11-6-8;
selectively firing for a second period of time spanning multiple engine cycles during the low-load condition following the first period of time only a second subset of two cylinders from each of the first donor and second non-donor banks according to the following pattern: 7-3-6-8; and
selectively firing for a third period of time spanning multiple engine cycles during the low-load condition following the second period of time only a third subset of two cylinders from each of the first donor and second non-donor banks according to the following pattern: 5-9-2-10, wherein:
a firing interval of the first, second, and third subsets during the low-load condition is always between about 165-195° of crank angle; and
a separate firing interval of each of the first and second cylinder banks during the low-load condition is always about 360° of crank angle.

* * * * *